Nov. 6, 1923.  1,472,946

F. TAYLOR ET AL
AUTOMATIC AIR INLET VALVE FOR LOW PRESSURE STEAM HEATING
APPARATUS AND THE LIKE
Filed May 28, 1923

Inventors:
Frank Taylor.
Hiriam Grimshaw Taylor.
By their Attorney: Walter Gunn

Patented Nov. 6, 1923.

1,472,946

UNITED STATES PATENT OFFICE.

FRANK TAYLOR AND HIRAM GRIMSHAW TAYLOR, OF RADCLIFFE, ENGLAND.

AUTOMATIC AIR-INLET VALVE FOR LOW-PRESSURE STEAM-HEATING APPARATUS AND THE LIKE.

Application filed May 28, 1923. Serial No. 642,062.

*To all whom it may concern:*

Be it known that FRANK TAYLOR and HIRAM GRIMSHAW TAYLOR, both subjects of the King of Great Britain and Ireland, residing at Radcliffe, Lancashire, England, have invented new and useful Improvements in or Relating to Automatic Air-Inlet Valves for Low-Pressure Steam-Heating Apparatus and the like, of which the following is a specification.

This invention refers to automatic air inlet valves for low pressure steam heated apparatus, and relates to combined mechanical and thermostatic valves of the kind wherein the thermal valve lies within the stem of the mechanical valve, and wherein the thermal valve serves to allow of the escape of air after the main valve has closed and before the steam closes the thermal valve.

The present invention consists of constructional improvements in said valves, whereby they are rendered more reliable in action, and whereby the parts are more readily made and assembled.

Figure 1:
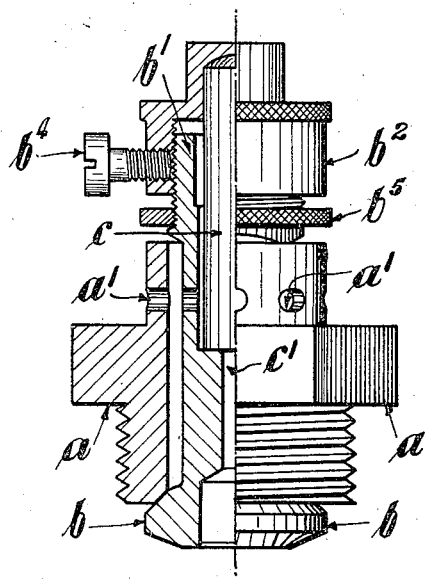
Fig. 1 illustrates a part vertical sectional elevation and a part exterior elevation of the improved combined valves both valves being shown closed.
Figure 2:
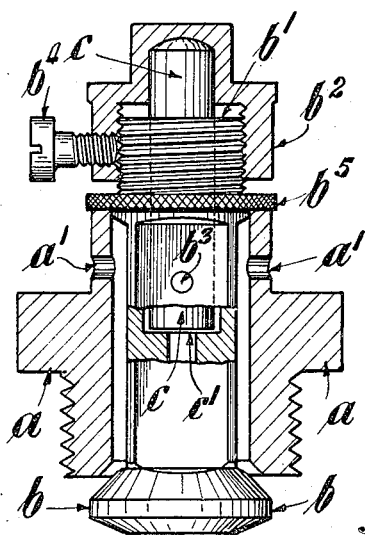
Fig. 2 illustrates a complete sectional elevation of the same valves but with both valves open.

$a$ is the valve casing, suitable for screwing into say a branch pipe of the steam heated apparatus. $b$ is the mechanical valve and $c$ the thermal valve, this latter consisting of a stick of ebonite or like expansive material. The stem $b'$ of the main valve $b$ is made hollow and open at the top to receive the valve $c$. Heretofore, the interior of the stem has been screw-threaded and the valve $c$ threaded on its exterior in order to be adjusted within the stem in relation to the opening $c'$.

At the top of the valve stem is a cap $b^2$ for closing the stem and also for fixing a washer $b^5$ which by resting on the top of the casing $a$ supports the valve $b$ when in the open position.

In the valve stem are holes $b^3$ and in the outer casing $a$ are holes $a'$ for the inlet of air when a vacuum threatens in the steam heated apparatus, and for the escape of air expelled by the steam prior to the closing of the valve $c$.

According to this invention, the thermal valve $c$ is without screw threads and fits tightly in the cap $b^2$. Further, a set screw $b^4$ is provided to fix the cap relatively to the stem $b'$ after being rotated to adjust the thermal valve, the end of the screw engaging the outer face of the valve stem. By this arrangement the thermal valve is not liable to be disturbed in its adjustment by the hammering of the valve $b$, or by excessive expansion, while by providing a positive setting of the cap, the thermal valve may act within finer limits then formerly.

The cap $b^2$, instead of serving only to close the stem $b'$ now serves also to adjust the valve $c$, the screw thread on the exterior of the valve stem also serving to allow of the adjustment of the washer $b^3$ relatively to the top of the casing $a$ when the valve is closed.

The valve $b$ is so coned on its upper face as also the lower part of the casing $a$ to ensure of a proper closure when in contact.

The action of the parts is as follows: On a sudden drop of pressure in the steam heated apparatus, the valve $b$ opens and lets in air, the valve $c$ at such time being at its full length and closing the opening $c'$. On the valve $c$ cooling, it shortens and uncovers the opening $c'$. On the steam pressure again rising in the apparatus, the valve $b$ closes, but the valve $c$ only closes slowly, and allows of any air to be driven out by the steam before finally closing. In this way the valves automatically control both the ingress and egress of air.

What we claim is:—

In air inlet valves of the kind referred to, a main mechanical valve with hollow stem and having perforations for the egress of air, a screwed cap for enclosing the top of the stem the exterior of which is screwthreaded, a thermal valve within said stem in the form of a plain cylindrical piece of material capable of expanding and contracting longitudinally under changes of temperature, the upper end of the thermal valve tightly fitting the said cap and adapted to be adjusted relatively to one of the holes in the main valve by rotating the said cap, a set screw for fixing the cap in fixed relation to the main valve stem, a washer upon the said screw-threaded part of the main valve stem and adjustable thereon, and an outer valve casing having air inlet holes and upon the upper edge of which casing the said washer rests when the main valve is open, as set forth.

In testimony whereof we have signed our names to this specification.

FRANK TAYLOR.
HIRAM GRIMSHAW TAYLOR.